United States Patent
Switsen

[11] 3,761,839
[45] Sept. 25, 1973

[54] SYNCHRONOUS FIRING CIRCUIT

[75] Inventor: Henry N. Switsen, 11319 Vanowen St., N. Hollywood, Calif. 91605

[22] Filed: June 14, 1971

[21] Appl. No.: 152,699

[52] U.S. Cl............ 331/107 R, 331/111, 331/129, 331/153, 331/173
[51] Int. Cl. ............................................. H03k 3/02
[58] Field of Search.................. 331/71, 107 R, 111, 331/129–131, 153, 172, 173

[56] References Cited
UNITED STATES PATENTS
3,525,951 8/1970 Plunkett.............................. 331/111
3,185,768 5/1965 Cudahy........................... 331/153 X Primary Examiner—Roy Lake
Assistant Examiner—Siegfried H. Grimm

[57] ABSTRACT

A circuit for modifying a standard Resistance-Capacitance charging circuit, commonly referred to as R.C. circuits, so as to make them more likely to reach a required voltage at only certain phases of the charging voltage, when that charging voltage contains a ripple component.

5 Claims, 5 Drawing Figures

Patented Sept. 25, 1973                                              3,761,839

INVENTOR HENRY N. SWITSEN

3,761,839

SYNCHRONOUS FIRING CIRCUIT

BACKGROUND OF THE INVENTION

1. Field of the Invention

This invention relates to apparatus for modifying the standard exponential R.C. time constant curve that appears across voltage sensors which are to perform some task when a predetermined voltage appears at the sensor terminals when these sensors are connected across the capacitor in an R.C. charging circuit.

2. Description of the Prior Art

R.C. charging circuits are often employed in timers where a voltage sensor is connected across the capacitor in the R.C. circuit.

When the charge on the capacitor reaches a predetermined level, the voltage sensor performs a given task.

In many circuits, the charging voltage applied across the R.C. portion of the circuit is not a pure D.C. voltage, but contains an A.C. ripple component as well. This has the effect of adding a ripple component to the exponential charging curve appearing across the capacitor.

When a voltage sensor is conected across the capacitor in such an R.C. portion of a circuit the result is a tendency for the voltage sensor to reach its predetermined sensing level, or "firing point," mostly during the time when the charging voltage across the R.C. portion is in one of its ripple adding periods. This is the times when the current in the resistor is greater, and the rate of rise of the voltage across the capacitor is greater.

If the conditions or characteristics of the overall circuit are most efficiently utilized when the "firing point" is reached only during one of the times when ripple adding current in addition to the D.C. current is flowing in the resistor of the R.C. circuit portion, it becomes necessary or desirable to adjust the actual value of the resistor, the capacitor, and the voltage to be sensed, as well as the charging voltage to be very stable. This is often very difficult, and in the case where the resistor is made variable to adjust the time delay to different times, control of the actual "phase" of firing only during one of these ripple periods becomes impossible.

This is because of the "filtering" action which takes place in the R.C. circuit capacitor, so that the ripple component in the charging voltage is seen greatly reduced across the capacitor, especially when the resistor becomes large enough to allow for the longer time delays. Firing only at certain phases of an A.C. voltage can be very useful in many stroboscopic lamp circuits.

SUMMARY OF THE INVENTION

In accordance with one embodiment of the present invention a simple circuit is provided to allow a substantially increased ripple voltage to appear across the voltage sensor even with very large resistances in the R.C. circuit so as to insure "firing" during one of the ripple added time periods. This is accomplished by increasing the effective impedance of the capacitor element.

In another embodiment of the invention, a ripple voltage is added to the exponential charging voltage across the capacitor by connecting a ripple source to the capacitor.

In yet another embodiment of the invention a combination of increasing the effective impedance of the capacitor in only one direction and having no impedance increase in the opposite direction is accomplished by the use of a diode across the impedance increasing means.

DESCRIPTION OF THE PREFERRED EMBODIMENTS

Figure 1:
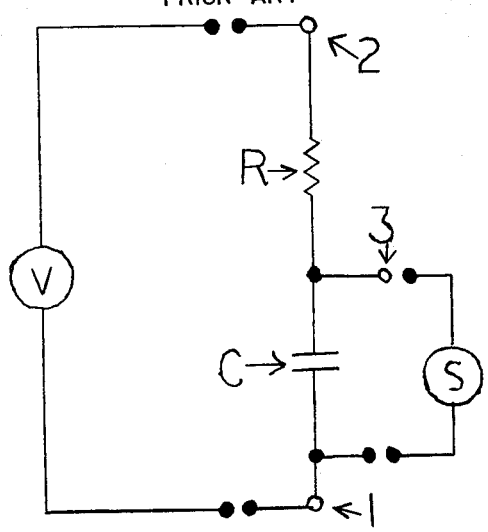
FIG. 1 is a schematic diagram of a prior art R.C. circuit where a very simple two terminal device such as a diac or neon lamp or the like is the voltage sensor.

FIG. 1 illustrates a prior art circuit where a resistor R and a capacitor C are in series, and comprise a conventional R.C. circuit, denoted between the point 1 and point 2. The point 3 defines the conection point between the resistor R and the capacitor C.

One very simple use of an R.C. circuit is for a timer, or an oscillator, where a two terminal switch device similar to a diac, a neon lamp, or the like is connected between the point 3 and the point 1, shown as S.

The two terminal device may be connected directly between point 3 and point 1, or additional components may be connected in series with the two terminal device to perform additional tasks; such as using a pulse transformer in series with the two terminal device, or possibly a gate to cathode junction of a silicon controlled rectifier to turn on the SCR with each "firing" of the two terminal device.

If a voltage V is now connected to the point 1 and to the point 2, the circuit of FIG. 1 can begin to oscillate at some frequency as determined by the actual values of the components used and the value of the voltage V.

All of this is well known prior art.

If the voltage V contains an A.C. component, the "firing" device S may tend to fire during portions of the charging curve at point 3 when the ripple component is at a maximum, but firing at such times is certainly not assured. If the voltage V contains very little or no A.C. component, then the oscillator is completly "free-running" and does not even have any tendency to fire at any particular relationship with any other circuit ripples or variations.

If it is desired to cause the firing of S at a certain relation-ship to some A.C. voltage in the circuit, then the R.C. portion of the circuit can be modified in accordance with one or more of the embodiments of the present invention. If the voltage V contains ripple, the embodiments of FIGS. 2 and 4 and FIG. 3 can be used to achieve that end. If the voltage V contains no A.C. component, then the embodiment of FIG. 3 or FIG. 5 is most likely to be of benefit.

Figure 2:
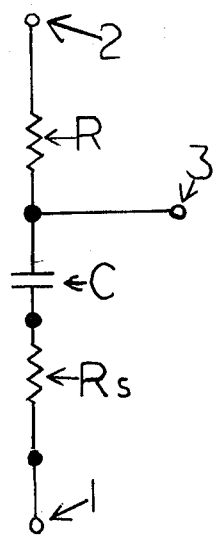
FIG. 2 is a schematic diagram of the R.C. circuit portion of the prior art modified in accordance with one embodiment of the present invention.
Figure 3:
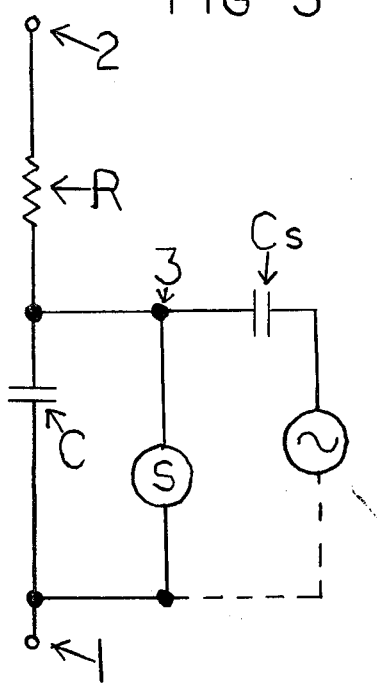
FIG. 3 is a schematic diagram of the R.C. portion of the prior art with an additional ripple adding element.

FIG. 2 illustrates one embodiment of the present invention which can be used if the voltage V contains the desired A.C. component to which the firing of S is to be synchronized, in frequency or in phase relation.

The addition of resistor Rs between the point 1 and the capacitor C will prevent the "filtering" of the A.C.

component from the point 3, and assure that the element S will be at its firing level only during one of the ripple adding time periods, and assures that the firing of S will be synchronized with the ripple.

FIG. 3 illustrates an embodiment of the present invention which can be used whether or not the voltage V contains the desired A.C. component to which the firing of S is to be synchronized.

A suitable impedance which can be a capacitor such as the capacitor Cs in FIG. 3 is connected between the point 3 and the desired A.C. component to which the firing of S is to be synchronized. The impedance Cs couples the desired A.C. component to the point 3 and so too, to the sensor S; This assures that the element S will be at its firing level only during the ripple adding time periods, and thus can fire only during one of these periods and not between periods.

Figure 4:
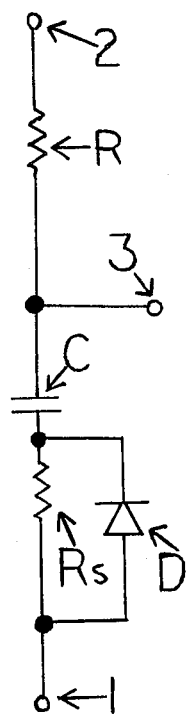
FIG. 4 is a schematic diagram of a further modification of FIG. 2.
Figure 5:
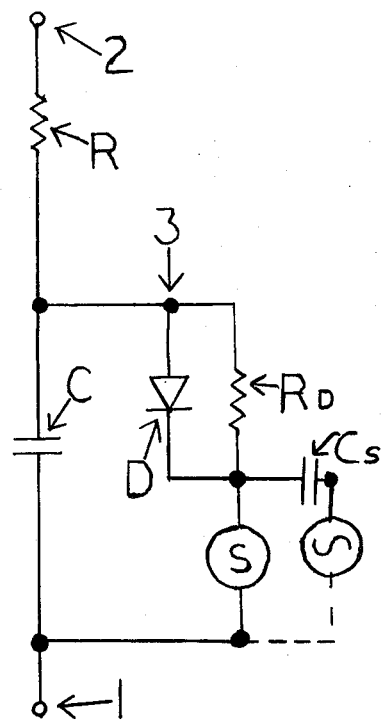
FIG. 5 is a schematic diagram of a further modification of the circuit of FIG. 3.

FIG. 4 illustrates an embodiment of the present invention which is similar to the embodiment described for the FIG. 2.

For certain circuits, especially where some other components are added in series with the element S, such as pulse transformers, the addition of the resistor Rs may cause the impedance of the firing circuit to become so large that sufficient current to perform the required task of the element S is no longer possible.

A diode D can be added in parallel with the resistor Rs as shown in FIG. 4. The effect of the diode in FIG. 4 is to allow the circuit to operate substantially as described for FIG. 2 until the firing of the element S. Then the diode clamps the resistor Rs and reduces the firing circuit impedance back to zero to allow the required current to flow.

Further modifications to the basic FIG. 1 are possible, such as combining the elements Rs, Cs, and D in different combinations not shown in the drawings, and changes in the circuit polarities, and different types of components for the element S. It is recognized that modifications and variations may readily occur to those skilled in the art and, consequently, it is intended that the claims be interpreted to cover such modifications and equivalents.

FIG. 5 illustrates one such variation and modification.

In FIG. 3, a circuit was described where a suitable impedance is connected between the point 3 and the desired A.C. component to which the firing of S is to be synchronized in frequency or phase relation.

The impedance is connected to point three because the sensor is also connected there, however, under certain circumstances it may be impractical to cause sufficient ripple at the point 3, such as when the capacitor C is very large.

In such a case, the suitable ripple coupling impedance can be coupled to the voltage sensor, (as before), but the voltage sensor can be decoupled from the point 3 by a suitable second impedance Rd in FIG. 5. If depending on the amount of decoupling used, it developes that the voltage sensor S can no longer draw sufficient current from the capacitor C when it 'fires,' as could be the case when a pulse transformer is used in series with sensor S, then a diode can be used across the impedance between the sensor and the point 3 to allow the full decoupling until sensor S fires, and then clamping the impedance between the sensor and point 3 back to zero during firing. Other variations are possible, and the claims should be interpreted to cover such variations.

What is claimed is:
1. A synchronous firing circuit comprising:
a voltage sensing switch means having at least a first terminal and a second terminal;
a voltage source having an A.C. component to trigger said voltage sensing switch means, and having at least a first terminal and a second terminal;
an R.C. circuit to control the firing time of said voltage sensing switch means including a first resistor and a capacitor in series connection, the point of connection being defined as the "sense point";
means for coupling said capacitor between said first terminal of said voltage source and said sense point;
means for coupling said first resistor between said second terminal of said voltage source and said sense point;
means for coupling said first terminal of said switch means to said sense point;
means for coupling said second terminal of said switch means to said first terminal of said voltage source; wherein:
said means for coupling said capacitor between said first terminal of said voltage source and said sense point includes a resistor to raise the impedance of said point so as to allow said A.C. component to trigger said switch means synchronous to a phase of said A.C. component.
2. The circuit described in claim 1 wherein:
said means for coupling said capacitor between said first terminal of said voltage source and said sense point includes a resistor and a diode in parallel.
3. A synchronous firing circuit comprising:
a voltage source having at least a first terminal and a second terminal;
a capacitor, and a resistor to supply resistor current to said capacitor, in series connection, the connection to the capacitor being defined as the "sense point";
means for coupling said capacitor between said first terminal of said voltage source and said sense point;
means for coupling said resistor between said second terminal of said voltage source and said sense point;
an A.C. voltage component to cause a ripple current to alternately add to, and subtract from, said resistor current;
a voltage sensing switch means having at least a first terminal and a second terminal, said voltage sensing switch means to fire only during a time when said ripple current is of an adding polarity to said resistor current;
means for coupling said voltage sensing switch means across said capacitor;
means for coupling an impedance means between said A.C. voltage component and the terminal of said voltage sensing switch means which couples to said sense point, to cause a ripple voltage to appear on the voltage sensing switch means terminal that couples to the sense point, so as to cause said voltage sensing switch meansto reach its sensing amplitude synchronous to a phase of said A.C. voltage component.
4. The circuit described in claim 3 wherein:

said means for coupling said voltage sensing switch means across said capacitor includes a resistance to prevent a ripple current caused by said A.C. voltage component from being filtered out by said capacitor.

5. The circuit described in claim 3 wherein:

said means for coupling said voltage sensing switch means across said capacitor includes a resistance to prevent a ripple current caused by said A.C. voltage component from being filtered out by said capacitor, and a diode in parallel, said diode oriented so as to cause a common current to flow in said voltage sensing switch means and said capacitor, after said voltage sensing switch means has triggered.

* * * * *